United States Patent
Johansson et al.

(10) Patent No.: US 11,548,548 B2
(45) Date of Patent: Jan. 10, 2023

(54) DYNAMIC END-STOPS FOR ELECTRIC POWER STEERING

(71) Applicant: Volvo Car Corporation, Gothenburg (SE)

(72) Inventors: Henrik Johansson, Alvangen (SE); Carl-Johan Hall, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 367 days.

(21) Appl. No.: 16/891,511

(22) Filed: Jun. 3, 2020

(65) Prior Publication Data
US 2020/0391791 A1    Dec. 17, 2020

(30) Foreign Application Priority Data
Jun. 17, 2019  (EP) ...................... 19180650

(51) Int. Cl.
*B62D 5/04* (2006.01)
(52) U.S. Cl.
CPC ......... *B62D 5/0469* (2013.01); *B62D 5/0421* (2013.01); *B62D 5/0463* (2013.01)
(58) Field of Classification Search
CPC ... B62D 5/0469; B62D 5/0421; B62D 5/0463
See application file for complete search history.

(56) References Cited

U.S. PATENT DOCUMENTS

| | | |
|---|---|---|
| 6,260,655 B1 | 7/2001 | Mukai et al. |
| 8,082,078 B2 | 12/2011 | Wittig |
| 9,008,911 B2 | 4/2015 | Degenstein |
| 9,434,406 B2 | 9/2016 | Guilemond et al. |
| 10,106,192 B2 | 10/2018 | Saal et al. |

(Continued)

FOREIGN PATENT DOCUMENTS

| | | |
|---|---|---|
| CN | 101987633 A | 3/2011 |
| CN | 105324291 A | 2/2016 |

(Continued)

OTHER PUBLICATIONS

Apr. 12, 2022 Office Action and Search Report issued in the corresponding CN application No. 202010546121.1.

(Continued)

*Primary Examiner* — Jacob D Knutson
(74) *Attorney, Agent, or Firm* — Clements Bernard Walker; Christopher L. Bernard

(57) ABSTRACT

A method for controlling an electrically powered steering assistance system including an electric motor for providing assisting torque to an axle of a vehicle such that impact between a wheel and the wheel housing can be prevented. Electrically powered steering assist systems include an electric motor for providing an assist steering torque to the steerable wheels of the vehicle. The electrical current used by the electric motor has a typical dependence with the amount of output torque from the motor. The electrical current of the electrical current used by the electric motor exhibits distinguishable characteristics when the wheels reach the end stop in the wheel housing. By monitoring the electrical current used by the electric motor for providing the assisting torque it is possible to determine that the wheels have reached the end-stop.

19 Claims, 4 Drawing Sheets

(56) References Cited

U.S. PATENT DOCUMENTS

| | | |
|---|---|---|
| 2007/0284180 A1 | 12/2007 | Suehiro |
| 2011/0264330 A1* | 10/2011 | Kimpara ............ H02P 21/0089 |
| | | 701/42 |
| 2017/0240201 A1 | 8/2017 | Kim et al. |

FOREIGN PATENT DOCUMENTS

| | | | | |
|---|---|---|---|---|
| CN | 105835944 A | * | 8/2016 | ........... B62D 5/0469 |
| CN | 107107952 A | | 8/2017 | |
| CN | 107499375 A | | 12/2017 | |
| EP | 1864886 A2 | * | 12/2007 | ........... B62D 5/0469 |
| EP | 1864886 A2 | | 12/2007 | |
| KR | 20120020937 A | * | 3/2012 | ............. B62D 6/007 |
| WO | WO-2018220851 A1 | * | 12/2018 | .......... B60W 60/001 |

OTHER PUBLICATIONS

Dec. 19, 2019 European Search Report issue on International Application No. EP19180650.

\* cited by examiner

DYNAMIC END-STOPS FOR ELECTRIC POWER STEERING

CROSS-REFERENCE TO RELATED APPLICATION

The present disclosure claims the benefit of priority of co-pending European Patent Application No. 19180650.4, filed on Jun. 17, 2019, and entitled "DYNAMIC END-STOPS FOR ELECTRIC POWER STEERING," the contents of which are incorporated in full by reference herein.

TECHNICAL FIELD

The present disclosure generally relates to a method for controlling an electrically powered steering assistance system, and to an electrically powered steering assistance system.

BACKGROUND

Vehicles are most commonly equipped with power assisted steering which provides for the driver to turn the steering wheel with less effort. Power assisted steering systems were for a long time dominated by hydraulic system. More recently have electric power assisted steering emerged into the market. Electric power assisted steering systems employ an electric motor to provide the assisting torque.

Electric power assisted steering systems provides a promising approach for steering assist with a more compact and fuel-efficient solution compared to the hydraulic systems. Generally, an electric power assisted steering system includes sensors for detecting the operation of the steering wheel and a processor for calculating the required assisting torque to be applied. The assisting torque may be applied in various ways to a steering system of the vehicle using an electric motor controlled by the processor.

However, when the driver steers fully to one end of the steering range, the wheels including tyres risk hitting the wheel housing and may cause damages in the wheel housing. This may for example be the case after changing to larger tyres.

Accordingly, there is a need for reducing the impact force or event avoiding mechanical impacts between the wheels and the wheel housing caused by end-steering by the driver.

SUMMARY

The disclosed subject matter generally relates to a method for controlling an electrically powered steering assistance system including an electric motor for providing assisting torque to an axle of a vehicle such that impact between a wheel and the wheel housing can be prevented.

Electrically powered steering assist systems include an electric motor for providing an assist steering torque to the steerable wheels of the vehicle. The electrical current used by the electric motor has a typical dependence with the amount of output torque from the motor. The inventors realized that the electrical current of the electrical current used by the electric motor exhibits distinguishable characteristics when the wheels reach the steering end stop in the wheel housing. Accordingly, by monitoring the electrical current used by the electric motor for providing the assisting torque it may be possible to, in a dynamic way determine that the wheels have reached the end-stop, or to even predict that the wheels are about to reach the end-stop.

The above advantages are obtained by, in response to identifying an electrical current characteristic in the monitored electrical current that matches a pre-determined model electrical current characteristic associated with that a steerable wheel has reached a steering end stop in a wheel housing, controlling the electric motor to reduce the provided assisting torque. In other words, the electric motor ensures that the wheels do not reach the end-stop such that damage in the wheel housing is at risk.

In embodiments, the pre-determined model electrical current characteristic may be based on a prior analysis of data indicative of a plurality of electrical current characteristics that occurred when the travel of a steering rack connected to the front wheels reached a a steering end stop. In other words, the pre-determined model electrical current characteristic may be based on learning from a large set of prior situations of front wheels that reached a respective a steering end stop, e.g. a mechanical stop.

For example, in some embodiments, the pre-determined model electrical current characteristic may be modelled by a machine learning algorithm. Hereby, a predictive way of preventing potentially damaging wheel and wheel housing impacts is provided that may be used in a large range of wheel installations. Thus, after a learning step, the machine learning algorithm may be applied to the monitored electrical current.

The electrical current is preferably continuously monitored in time windows of predetermined duration, e.g. a sampling time.

The inventors also propose an electrically powered steering assistance system for a vehicle, the system comprising: an electric motor connectable to a steering rack of an axle of a vehicle for providing an assist steering torque to steerable wheels of the axle, and a control unit configured to: monitor an electrical current used by the electric motor for providing the assisting torque, in response to identifying an electrical current characteristic in the monitored electrical current that matches a pre-determined model electrical current characteristic associated with that a steerable wheel has reached a steering end stop in a wheel housing, control the electric motor to reduce the provided assisting steering torque.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the disclosed subject matter will now be described in more detail, with reference to the appended drawings showing example embodiments of the present disclosure, wherein.

DESCRIPTION OF EMBODIMENTS

Figure 1A:
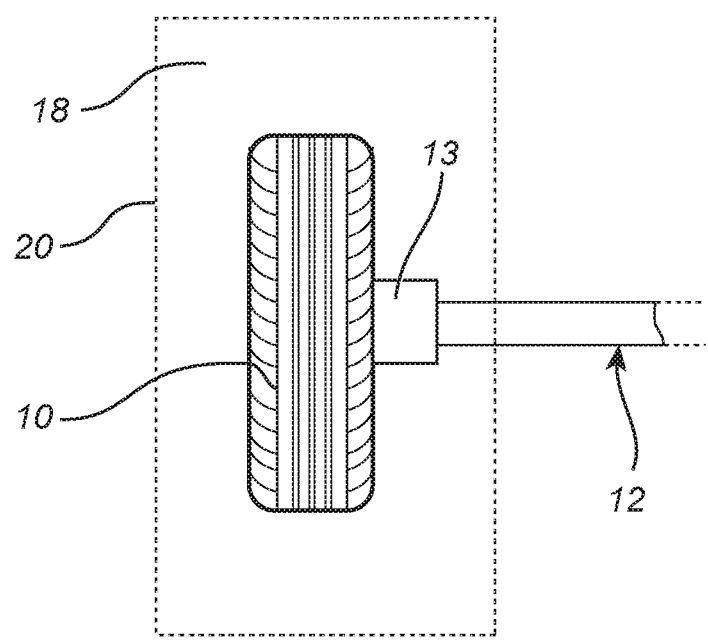
FIGS. 1A-C conceptually illustrate a vehicle wheel at different steering angles in a wheel housing.

In the present detailed description, various embodiments of a method and a system according to the present disclosure are described. However, embodiments of the present disclosure may be embodied in many different forms and should not be construed as limited to the embodiments set forth herein; rather, these embodiments are provided for thoroughness and completeness, and to fully convey the scope of the disclosure to the skilled person. In some instances, well known structures and devices are shown in block diagram form in order to avoid obscuring the novelty of the exemplary embodiments presented herein. Like reference characters refer to like elements throughout.

FIG. 1A schematically illustrates a steerable wheel 10 coupled to a steering rack 12 via a coupling mechanism 13 that allows for turning the wheel. The steerable wheel 10 may be steered by user input provided via a steering wheel in combination with assisting steering torque provided by an electric motor connected to the steering rack 12. The details of the operation of the electric motor will be discussed below with reference to subsequent drawings.

A wheel is herein intended to include e.g. the wheel rim, the tyre or generally the parts associated with the wheel arranged in the wheel housing and that turns in response to a steering action provided by a driver for altering the direction of the vehicle and that may risk colliding with the wheel housing or components in the wheel housing, as described herein.

The wheel 10 is arranged in a wheel housing 18, here the inner boundaries 20 of the wheel housings 18 are conceptually indicated. In FIG. 1A is the wheel pointing forward, in other words, the vehicle is intended to be steered in a directly forward direction. In this situation, illustrated in FIG. 1A, the wheel 10 is clear of the wheel housing inner boundaries 20, i.e. the inner walls of the wheel housing 18.

Figure 1B:
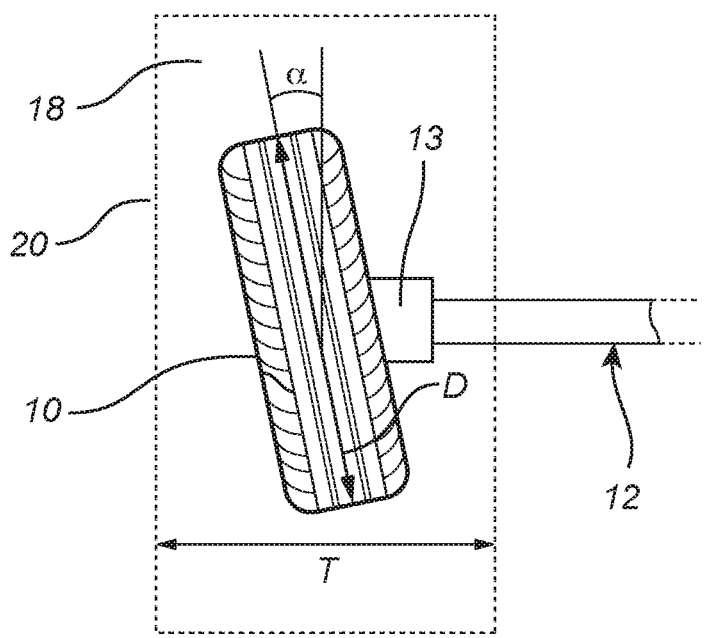

In FIG. 1B is the wheel 10 turned by a steering angle α. In other words, the driver has provided input to the steering system of the vehicle via a steering wheel to control the wheel 10 to turn. The steering torque provided by the driver is assisted by steering assist torque provided by an electric motor of an electrically powered steering assistance system in order reduce the amount of torque needed from the driver to steer the vehicle, thereby less effort is needed from the driver. In the situation shown in FIG. 1B, the wheel 10 is still clear of the wheel housing inner walls 20.

Figure 1C:
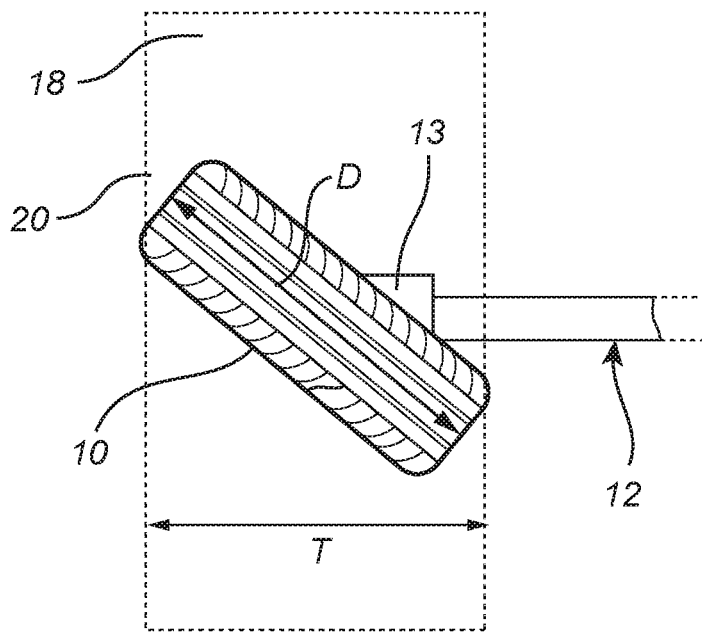

However, as the driver continues to increase the steering angle α by further input via the steering wheel, assisted by the electric motor, the wheel 10 approaches the wheel housing inner walls 20. Since the diameter D of the wheel is larger than the transverse dimension T of the wheel housing 18, the wheel 10 risks impacting with the wheel housing inner walls 20 as the wheel approaches a transversal orientation as schematically shown in FIG. 1C. The transverse direction is defined as the side-to-side extension of the vehicle, i.e. generally orthogonally with the normal forward driving direction or heading of the vehicle. The situation shown in FIG. 1C is desirable to avoid since it may lead to damages on the wheel 10 and the wheel housing 18 or housing walls 20, or components in the wheel housing 18. The present disclosure provides methods and systems for preventing this situation from appearing.

Figure 2:
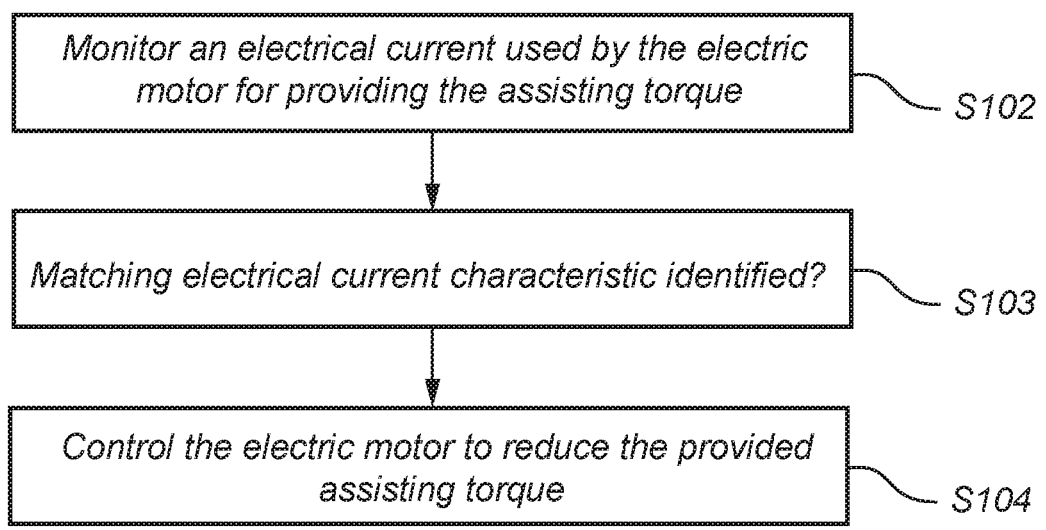
FIG. 2 is a flow-chart of method steps according to embodiments of the present disclosure.

Therefore, as illustrated in the flow-chart of FIG. 2, the present disclosure provides a method for controlling an electrically powered steering assistance system including an electric motor for providing assisting steering torque to steerable wheels of a vehicle. The method comprises step S102 of monitoring an electrical current used by the electric motor for providing the assisting steering torque. In response to identifying an electrical current characteristic in the monitored electrical current that matches, in step S103, a pre-determined model electrical current characteristic associated with that a steerable wheel has reached a steering end stop in a wheel housing, controlling the electric motor to reduce the provided assisting steering torque in step S104.

The proposed method is based on the realization that as the wheels reach or hit a steering end-stop, the electrical current drawn by the electric motor exhibits a characteristics behaviour. By mapping electrical current characteristic in the monitored electrical current to a known predetermined model electrical current characteristic, it is possible to prohibit the wheels from gaining larger steering angle that may cause impact between the wheels and the wheel housing. Further, using pre-determined models of electrical current characteristic that are definable as models in software using e.g. learning steps, the method may in a straight forward way be applied for different types of wheel and wheel housing.

Monitoring the electrical current may include to measure and analyse the electrical current versus some other parameter, such as time or electric motor power output or revolutions.

The electrical current may be continuously monitored or may be triggered by a steering torque input by the driver, or that the steering angle exceed an initial threshold angle.

The provided assisting torque is provided to cause a travel of a steering rack connected to the steerable wheels of the vehicle for turning the wheels as is described below. The reduction in the provided assisting torque is such that the travel of the steering rack is limited to not travel beyond the present position of the rack when the matching electrical current characteristic was identified. In other words, the amount of provided assisting torque is adjusted to a level so that the rack may not travel beyond a point which is known to cause an impact between a wheel and the wheel housing or components therein. In some embodiments, the provided assisting torque may be reduced to substantially zero. In some embodiments, controlling the electric motor to provide a counteracting steering force for moving the wheel away from the wheel housing wall or the components therein that the wheel is approaching.

Figure 3:
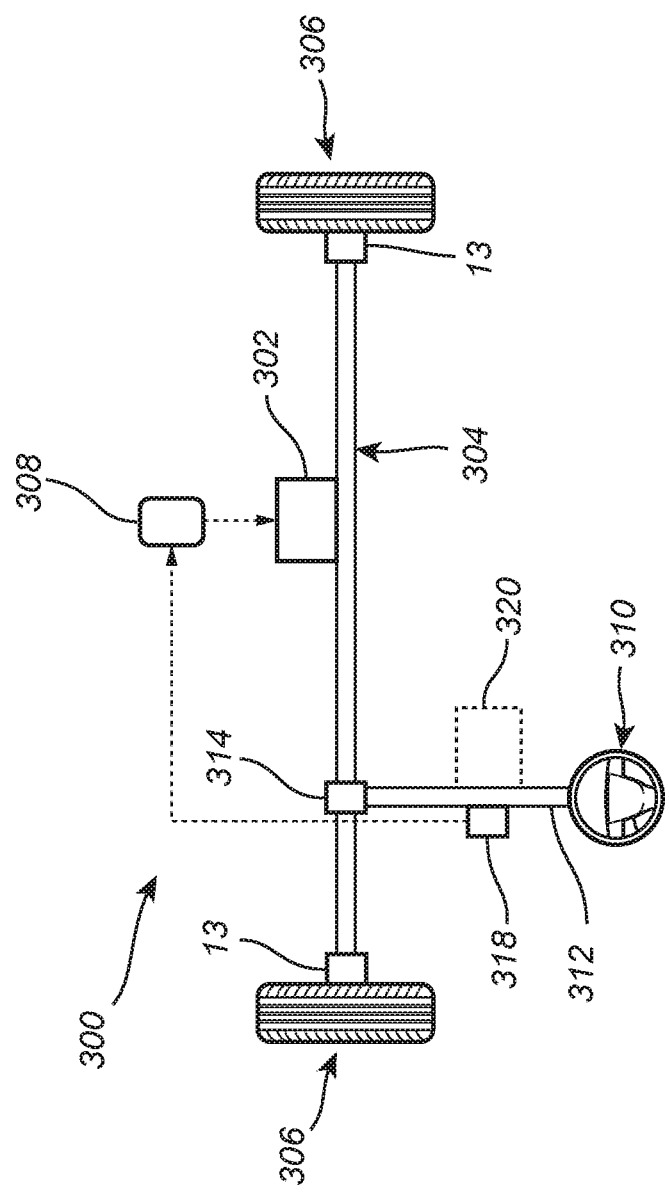
FIG. 3 conceptually illustrates an electrically powered steering assistance system according to embodiments of the present disclosure.

FIG. 3 illustrates an electrically powered steering assistance system 300 according to embodiments of the present disclosure. The electrically powered steering assistance system is adapted for arrangement at a front axle of a vehicle and comprises an electric motor 302 connectable to a steering rack 304 of a vehicle for providing an assist steering torque to front wheels 306 of the axle. The electrically powered steering assistance system 300 comprises a control unit 308 configured to control the electric motor 302 to provide variable degree of steering assist torque. The electric motor 302 is powered by a battery (not shown) which provides a prescribed supply voltage.

FIG. 3 further illustrates a steering wheel 310 connected with a steering column 312 by means known in the art. Further, the steering column 312 is coupled to the steering rack 304 via a mechanical gear connection 314 such as the often-used rack and pinion connection. The mechanical gear connection 314 is adapted such that a rotational motion of the steering column 312 is translated to a translational motion of the steering rack 304.

The electric motor 302 may be adapted provide assisting steering torque by adding translational force to the steering rack 304 via e.g. a rack and pinion connection or any other suitable known mechanical connection, such as a belt to a ball-nut assembly, i.e. the belt rotates the ball-nut including threads which causes the steering rack to be translated. Mechanical connections between electric motors and steering racks are considered known to the skilled person and will not be described in detail herein.

The wheels 306 are coupled to the steering rack 304 via a coupling mechanism 316 which allow for the wheels to turn in response to a translational motion of the steering rack 304. In other words, the assisting steering torque provided by the electric motor 302 is provided to cause a travel of the rack 304 connected to the steerable wheels 306 of the vehicle for turning the wheels 306. Such coupling mechanism 316 typically includes a king pin and tie rod connection although other coupling mechanisms are possible and within the scope of the present disclosure.

As is often the case, a torque sensor 318 is arranged to measure the torque provided to the steering column 312 via the steering wheel 310. The measured torque is thus the resulting torque needed for the driver for turning the wheel with the assisting steering torque provided by the electric motor 302.

The control unit 308 is configured to monitor an electrical current used by the electric motor for providing the assisting steering torque. Further, in response to identifying an electrical current characteristic in the monitored electrical current that matches a pre-determined model electrical current characteristic, the control unit is configured to control the electric motor to reduce the provided assisting torque. The system 300 may comprise a sensor for monitoring the electrical current used by the electric motor, wherein the control unit is connected to the sensor for receiving electrical current data. Electrical current sensors are known per se and will not be described further herein.

The electric motor 302 is here shown arranged at the steering rack 304 configured to directly apply a force to the steering rack 304. In alternative implementations may the electric motor instead be arranged at the steering column 312 to apply an assisting torque to the steering torque to provide its assisting steering torque, as conceptually represented by the alternative electric motor 320.

Figure 4:
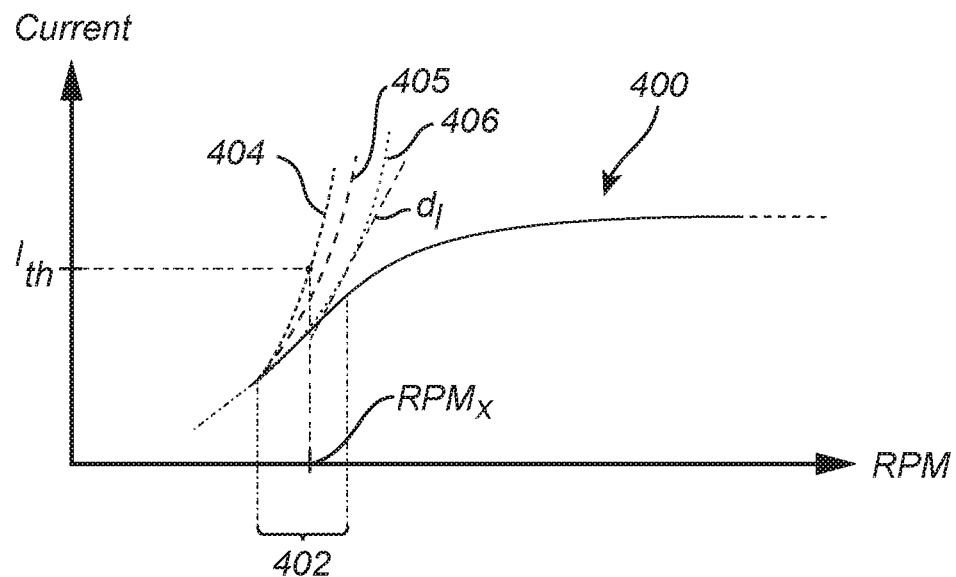
FIG. 4 conceptually illustrates electrical current characteristics.

FIG. 4 illustrates a conceptual example nominal curve 400 representing electrical current versus electric motor revolution rate, here expressed as revolutions per minute, RPM. At low RPM, less electrical current is drawn compared to at higher RPM. The curve 400 represents a nominal behaviour of the electrical current versus RPM for cases where the steering rack has not reached a mechanical end stop. It is often the case that the current versus RPM characteristic is near linear for a range 402 of RPM values.

According to embodiments, the pre-determined model electrical current characteristic is based on an analyzing to the electrical current used by the electric motor with regards to the revolution rate of the electric motor. For example, in the event that the steering rack has reached a mechanical end stop, e.g. the wheel 10 has collided into the wheel housing wall 20 or another component, as illustrated in FIG. 1C, then the electric motor will supply more electrical current in order to attempt for the wheel to turn further. This results in a deviating behaviour, as is illustrated by the example conceptual deviations 404, 405, 406 in the from the nominal electrical current versus RPM curve 400. Thus, it is possible to study the electrical current used by the motor with regards to the revolution rate of the electric motor in order to determine whether the steering rack has reached an end-stop. In embodiments, the pre-determined model electrical current characteristic may include a deviation from a nominal relationship between electrical current and revolution rate of the electric motor in a predetermined range of revolution rate. For example, the pre-determined model electrical current characteristic may include a deviation from a linear relationship, e.g. in the range 402, of the electrical current used by the motor with regards an increasing revolution rate of the electric motor.

By training an algorithm to recognize when a deviation occurs that matches with a model electrical current characteristic, the electric motor may be responsive to reduce the supplied assisting torque or stop supplying assisting torque altogether, or provide a counter-acting torque. Thus, the algorithm may be trained to detect a deviation, 404, 405, 405, from the nominal curve 400 based on several factors that may together build a pre-determined model electrical current characteristic.

In embodiments, the pre-determined model electrical current characteristic may include an electrical current value that exceeds an electrical current magnitude threshold at a predetermined revolution rate, $RPM_x$. Accordingly, and as illustrated in FIG. 4, the deviation may be recognized by an electrical current that exceeds an electrical current magnitude threshold $I_{th}$ at the revolution rate $RPM_x$.

According to embodiments, the pre-determined model electrical current characteristic may include an electrical current gradient that exceeds an electrical current gradient threshold. Accordingly, and as illustrated in FIG. 4, the deviation may be recognized by an electrical current gradient $d_I$ that exceeds a threshold. E.g. a large gradient indicates a deviating behavior of the supplied electrical current. Each of the deviating curves 404, 405, 406 has an increasing gradient which indicates an increasing deviation from the nominal curve 400. As the gradient becomes higher than the threshold, the electric motor may be controlled to reduce the provided assisting torque or stop providing assisting torque. By analyzing the gradient as part of the model, the detection of a deviation is more robust.

An overall electrical current offset may shift the nominal curve 400 up or down on the current axis. This offset depends on the specific design of the steering system of the vehicle, e.g. the steering rack, the steering column, and coupling mechanisms between the different parts of the steering system that may affect the friction in the system, and on the supply voltage provided to the electric motor. For example, a higher friction in the steering system yields a larger offset. To take the offset into account, the offset may be measured for a specific case, or preferably taught to a machine learning algorithm, see FIG. 5.

Figure 5:
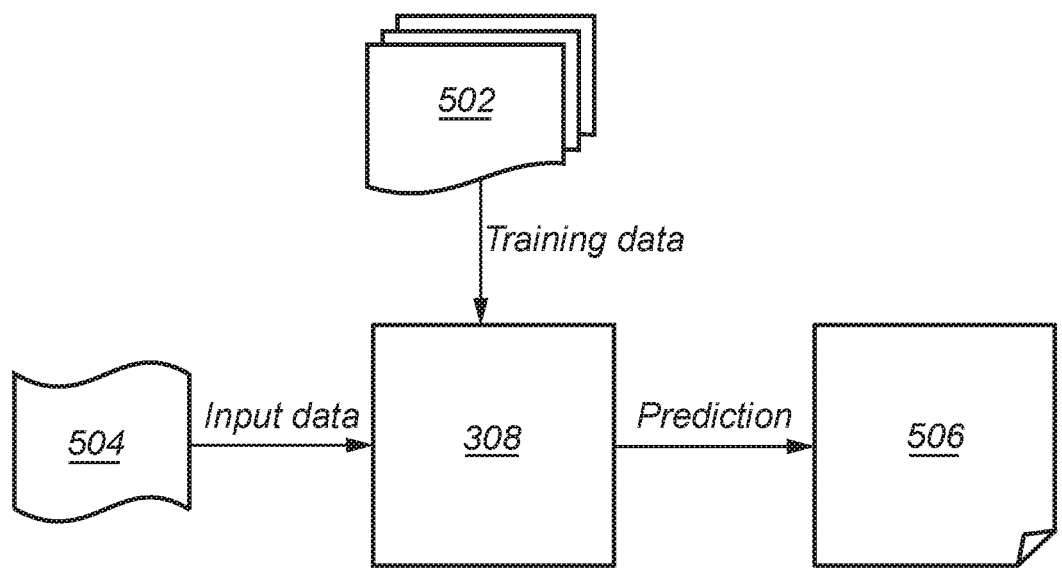
FIG. 5 is a functional box diagram conceptually illustrating embodiments of the present disclosure.

FIG. 5 is a functional box diagram representing embodiments of the present disclosure. In FIG. 5 is a control unit 308 is configured to receive training data 502. The training data 502 is electrical current characteristics data from a plurality of measurements. The training data 502 includes electrical current characteristics data indicating that the travel of a rack connected to the steerable wheels reached a mechanical stop, but also data representing nominal electrical current characteristics, e.g. similar to the curve 400 in FIG. 4. The predetermined model electrical current characteristics may be based on an analysis of the data 502 such that a machine learning algorithm may learn to recognize a deviation from the nominal electrical current characteristics.

Accordingly, the pre-determined model electrical current characteristic may be based on a prior analysis of data 502 indicative of a plurality of electrical current characteristics that occurred when the travel of a rack connected to the steerable wheels reached a mechanical stop. Using such a large data analysis provides for an accurate model for predicting that the wheels are near to reaching or has reached a mechanical stop.

Preferably, the pre-determined model electrical current characteristic is modelled by a machine learning algorithm. The machine learning algorithm code may be stored on a memory storage device accessible to the control unit 308.

In operation, the control unit 308 receives input data 504 in the form of monitored electrical current, e.g. sampled over a time duration with a sampling rate enough to capture relevant electrical current variations relevant to electric motor operation. Based on the input data, and on the pre-determined model electrical current characteristic determined from the training data, in a prior training stage, the control unit 308, which is configured to apply a machine learning algorithm using the model electrical current characteristic, predicts whether the wheels have reached near or to the mechanical stop in the wheel housing, and outputs the prediction 506. If the prediction is that the wheels have reached near or to the mechanical stop, the electric motor is controlled to reduce the provided assisting steering torque.

Accordingly, as described in FIG. 5, identifying that an electrical current characteristic in the monitored electrical current matches a pre-determined model electrical current characteristic includes applying a machine learning algorithm to the monitored electrical current.

There is further provided a control unit arranged to control an electrically powered steering assistance system including an electric motor for providing assisting torque to steerable wheels of a vehicle, wherein the control unit is configured to: monitor an electrical current used by the electric motor for providing the assisting steering torque, in response to identifying an electrical current characteristic in the monitored electrical current that matches a pre-determined model electrical current characteristic associated with that a steerable wheel has reached a steering end stop in a wheel housing, control the electric motor to reduce the provided assisting steering torque.

The control unit may have access to a memory storage device having thereon stored the pre-determined model electrical current characteristic.

In addition, there is provided a computer program product comprising a computer readable medium having stored thereon computer program means for controlling an electric motor of an electrically powered steering assistance system for providing assisting steering torque to steerable wheels of a vehicle, wherein the computer program product comprises: code for identifying an electrical current characteristic in a monitored electrical current used by the electric motor for providing the assisting steering torque, and code for determining that the electrical current characteristic matches a pre-determined model electrical current characteristic associated with that a steerable wheel has reached a steering end stop in a wheel housing, and code for, in response to that the electrical current characteristic matches the pre-determined model electrical current characteristic, controlling the electric motor to reduce the provided assisting steering torque.

The communication between the control unit and other devices, systems, or components may be hardwired or may use other known electrical connection techniques, or wireless networks, known in the art such as via CAN-buses, Bluetooth, Wifi, Ethernet, 3G, 4G, 5G, etc.

A control unit may include a microprocessor, microcontroller, programmable digital signal processor or another programmable device, as well as be embedded into the vehicle/power train control logic/hardware. The control unit may also, or instead, include an application-specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may comprise modules in either hardware or software, or partially in hardware or software and communicate using known transmission buses such as CAN-bus and/or wireless communication capabilities.

A control unit of the present disclosure is generally known as an ECU, electronic control unit.

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/ or firmware.

Various examples have been described. These and other examples are within the scope of the following claims.

The invention claimed is:

1. A method for controlling an electrically powered steering assistance system including an electric motor for providing assisting steering torque to steerable wheels of a vehicle, the method comprising:
   monitoring an electrical current used by the electric motor for providing the assisting torque; and
   in response to identifying an electrical current characteristic in the monitored electrical current that matches a pre-determined model electrical current characteristic associated with that one of the steerable wheels has reached a steering end stop in a wheel housing, controlling the electric motor to reduce the provided assisting steering torque;
   wherein monitoring the electrical current is triggered by that a steering angle exceeds an initial threshold angle.

2. The method according to claim 1, wherein the provided assisting torque is provided to cause a travel of a steering rack connected to the steerable wheels of the vehicle for turning the wheels, wherein the reduction in the provided assisting torque is such that the travel of the steering rack is limited to not travel beyond the present position of the steering rack when the matching electrical current characteristic was identified.

3. The method according to claim 1, wherein the provided assisting steering torque is reduced to substantially zero.

4. The method according to claim 1, wherein the pre-determined model electrical current characteristic is based on a prior analysis of data indicative of a plurality of electrical current characteristics that occurred when the travel of a steering rack connected to the steerable wheels reached a steering end stop.

5. The method according to claim 4, wherein the pre-determined model electrical current characteristic is modelled by a machine learning algorithm.

6. The method according to claim 1, wherein the pre-determined model electrical current characteristic is an electrical current gradient that exceeds an electrical current gradient threshold.

7. The method according to claim 1, wherein the pre-determined model electrical current characteristic is an electrical current that exceeds an electrical current magnitude threshold.

8. The method according to claim 1, wherein the pre-determined model electrical current characteristic is based on analyzing to the electrical current used by the electric motor with regards to the revolution rate of the electric motor.

9. The method according to claim 1, wherein the pre-determined model electrical current characteristic includes a deviation from a linear relationship of the electrical current used by the motor with regards an increasing revolution rate of the electric motor.

10. The method according to claim 1, wherein identifying that the electrical current characteristic in the monitored electrical current matches the pre-determined model electrical current characteristic includes applying a machine learning algorithm to the monitored electrical current.

11. The method according to claim 1, comprising:
    subsequent to reducing the provided assisting torque, controlling the electric motor to provide a counter-torque.

12. The method according to claim 1, wherein the electrical current is continuously monitored over a time period when the vehicle is operative.

13. The method according to claim 1, wherein monitoring the electrical current is triggered by a steering torque input by a driver.

14. An electrically powered steering assistance system for a vehicle, the system comprising:
    an electric motor connectable to a steering rack of an axle of the vehicle for providing an assist steering torque to steerable wheels of the axle; and
    a control unit configured to:
    monitor an electrical current used by the electric motor for providing the assisting torque, and
    in response to identifying an electrical current characteristic in the monitored electrical current that matches a pre-determined model electrical current characteristic associated with that one of the steerable wheels has reached a steering end stop in a wheel housing, control the electric motor to reduce the provided assisting steering torque;
    wherein monitoring the electrical current is triggered by that a steering angle exceeds an initial threshold angle.

15. The electrically powered steering assistance system according to claim 14, comprising a sensor for monitoring the electrical current used by the electric motor, wherein the control unit is connected to the sensor for receiving electrical current data.

16. A vehicle comprising the system according to claim 14.

17. A control unit arranged to control an electrically powered steering assistance system including an electric motor for providing assisting torque to steerable wheels of a vehicle, wherein the control unit is configured to:
   monitor an electrical current used by the electric motor for providing the assisting steering torque; and
   in response to identifying an electrical current characteristic in the monitored electrical current that matches a pre-determined model electrical current characteristic associated with that one of the steerable wheels has reached a steering end stop in a wheel housing, control the electric motor to reduce the provided assisting steering torque;
   wherein monitoring the electrical current is triggered by that a steering angle exceeds an initial threshold angle.

18. The control unit according to claim 17, wherein the control unit has access to a memory storage device having thereon stored the pre-determined model electrical current characteristic.

19. A computer program product comprising a computer readable medium having stored thereon computer program means for controlling an electric motor of an electrically powered steering assistance system for providing assisting steering torque to steerable wheels of a vehicle, wherein the computer program product comprises:
   code for identifying an electrical current characteristic in a monitored electrical current used by the electric motor for providing the assisting steering torque;
   code for determining that the electrical current characteristic matches a pre-determined model electrical current characteristic associated with that one of the steerable wheels has reached a steering end stop in a wheel housing; and
   code for, in response to that the electrical current characteristic matches the pre-determined model electrical current characteristic, controlling the electric motor to reduce the provided assisting steering torque;
   wherein monitoring the electrical current is triggered by that a steering angle exceeds an initial threshold angle.

\* \* \* \* \*